(12) United States Patent
Daniel et al.

(10) Patent No.: US 9,005,041 B2
(45) Date of Patent: Apr. 14, 2015

(54) DRIVELINE SHIELD ASSEMBLY

(71) Applicant: Omni USA, Inc., Houston, TX (US)

(72) Inventors: Jeffrey K. Daniel, Houston, TX (US); David Kemper, Houston, TX (US); Daniel Matthews, Conroe, TX (US)

(73) Assignee: Omni USA, Inc., Houston, TX (US)

( * ) Notice: Subject to any disclaimer, the term of this patent is extended or adjusted under 35 U.S.C. 154(b) by 0 days.

(21) Appl. No.: 13/763,154

(22) Filed: Feb. 8, 2013

(65) Prior Publication Data

US 2014/0228136 A1 Aug. 14, 2014

(51) Int. Cl.
*F16D 3/84* (2006.01)
*F16P 1/04* (2006.01)

(52) U.S. Cl.
CPC . *F16P 1/04* (2013.01); *F16D 3/841* (2013.01); *Y10S 24/28* (2013.01)

(58) Field of Classification Search
USPC .......... 464/170, 172, 173, 175, 178; 384/295, 384/296, 439, 539, 559, 617; 24/458, 663, 24/901, DIG. 28; 56/DIG. 24
See application file for complete search history.

(56) References Cited

U.S. PATENT DOCUMENTS

| | | | | |
|---|---|---|---|---|
| 2,924,953 | A * | 2/1960 | Cooney, Jr. | 464/178 |
| 3,194,615 | A * | 7/1965 | Weasler | 464/172 X |
| 4,747,804 | A * | 5/1988 | Benzi | 464/170 |
| 5,800,271 | A * | 9/1998 | Herchenbach et al. | 464/172 |
| 5,971,858 | A * | 10/1999 | Aurora | 464/172 |

OTHER PUBLICATIONS

Universal Joint and Driveshaft Design Manual, AE-7, Society of Automotive Engineers, Inc., Warrendale, PA, pp. 293-308, TJ1079. S62 1979.*

* cited by examiner

*Primary Examiner* — Gregory Binda
(74) *Attorney, Agent, or Firm* — Haynes and Boone, LLP

(57) ABSTRACT

A driveline shield system having a cap disposed to releasably engage a bearing mounted adjacent a drive shaft. The cap supports a tubular guard or shield in a coaxial position relative to the drive shaft. One or more lugs on the bearing are disposed to seat in corresponding slots formed in the cap. When the lugs are seated in the slots, rotation of the cap relative to the bearing causes the bearing and the cap to engage one another. A U-shaped clip is pivotally mounted to the cap and rotatable between a first position in which the clip extends into the slot and secures the lugs in engagement with the cap and a second release position in which the clip is retracted from the slot, thereby permitting relative rotation between the cap and bearing.

23 Claims, 4 Drawing Sheets

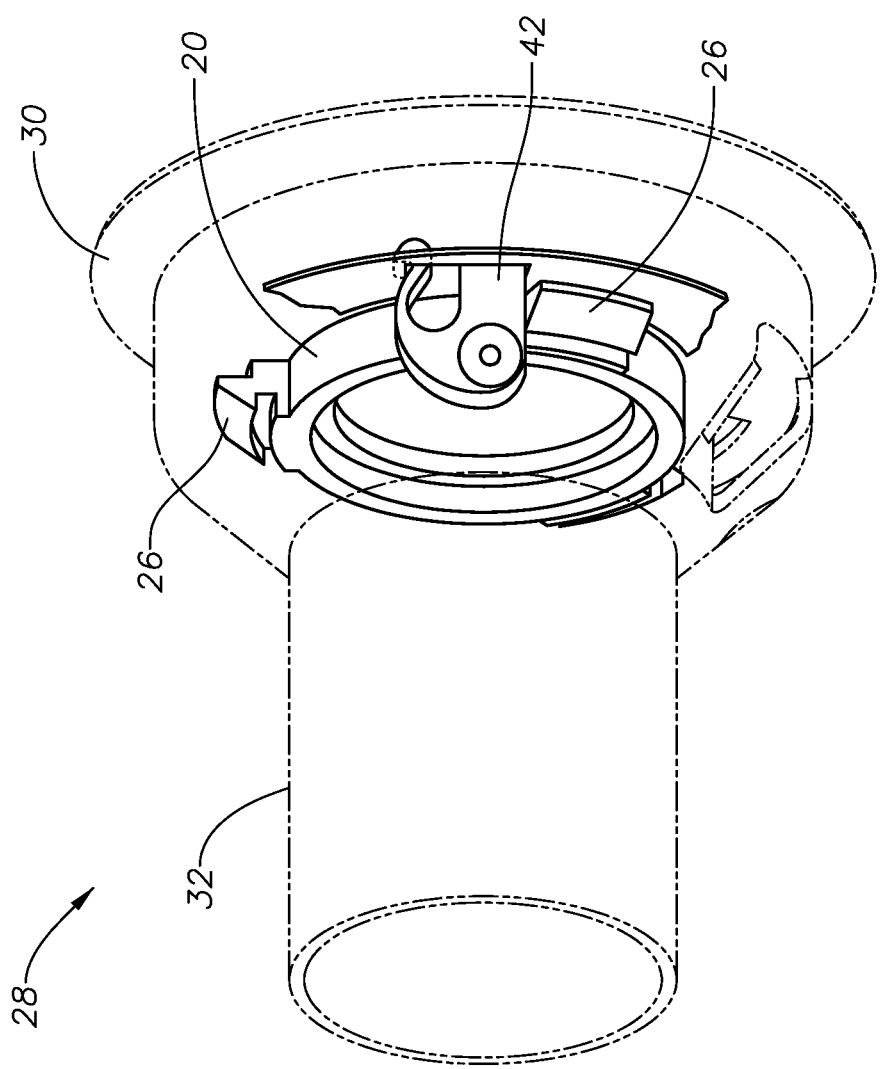

DRIVELINE SHIELD ASSEMBLY

BACKGROUND OF THE INVENTION

1. Technical Field

The present invention relates to a safety guard for driveshafts of agricultural equipment.

2. Description of the Related Art

Rotating shafts, especially driveshafts and power take-off shafts used in driving, or in drivelines of, agricultural implements can have rotating components that would be exposed to the surrounding environment unless shielded in some way. Exposed rotating components are a hazard and are susceptible to damage if interfered with. Covers and guards are typically used to partially or fully encase these components. The guards typically comprise one or more plastic tubes that extend along and around the rotating shaft and components.

A common arrangement typically includes a connection cap that has an integrally formed bearing surface disposed to engage a rotating drive component so as to permit the drive component to rotate relative to the connection cap. The connection cap also includes a tubular portion that extends axially along a drive shaft. The tubular portion of the cap is disposed to nest within one or more plastic tubes that extent axially along the drive shaft. A protective cone or bellows also extends from the connection cap over certain of the drive components, such as a universal joint. Commonly, the tubes are arranged to telescope axially relative to one another in order to adjust for shaft length and movement during operation.

In certain prior art configurations, the bearing and the connection cap may be separately formed and connected to one another with a fastener so as to permit the components to be disengaged from one another in order to service the rotatable components.

One drawback of the prior art is that the connection caps and shields are not readily disengaged from around the rotatable components to permit servicing of the components. To the extent fasteners are utilized to the fasteners have a tendency to become loose or even fully release the components from one another over time.

SUMMARY OF THE INVENTION

It is an object of the invention to provide a driveline shield system that can be securely fastened around a driveline during operation, but that can be readily removed as desired.

In accordance with the invention, a bearing engages a rotating portion of a drive system. The bearing includes at least one projection disposed to engage a slot formed in a connection cap. A U-shaped clip pivotally mounted to the connection cap is rotatable between a first locking position and a second release position. In the locking position, a first leg of the U-shaped clip secures the bearing projection within the cap slot and a shoulder on a second leg of the U-shaped clip engages the connection cap to secure the clip in a locking position.

In a preferred embodiment, the first leg of the U-shaped clip has a thickness greater than the second leg of the U-shaped clip. The second leg of the U-shaped clip is flexible to facilitate engagement of the shoulder with the cap. In certain embodiments, the second leg of the U-shaped clip may be contoured to enhance resiliency while strengthening the leg.

The U-shaped clip pivots around an axis that is perpendicular to the major axis of the connection cap. In certain preferred embodiments, the pivot axis of the U-shaped clip is spaced apart from the major axis of the connection cap. An aperture disposed for receipt of a pin may be formed along the pivot axis of the U-shaped clip. Alternatively, projections may be integrally formed on the clip so as to be coaxial with the pivot axis.

BRIEF DESCRIPTION OF THE DRAWINGS

FIG. 5A is a three-dimensional view of the U-shaped clip of the shield system mounted on the connection cap and securing the bearing to the connection cap.

FIG. 5B is a three-dimensional view of the U-shaped clip of the shield system mounted on the connection cap in a release position.

DETAILED DESCRIPTION OF THE DRAWINGS

Figure 1:
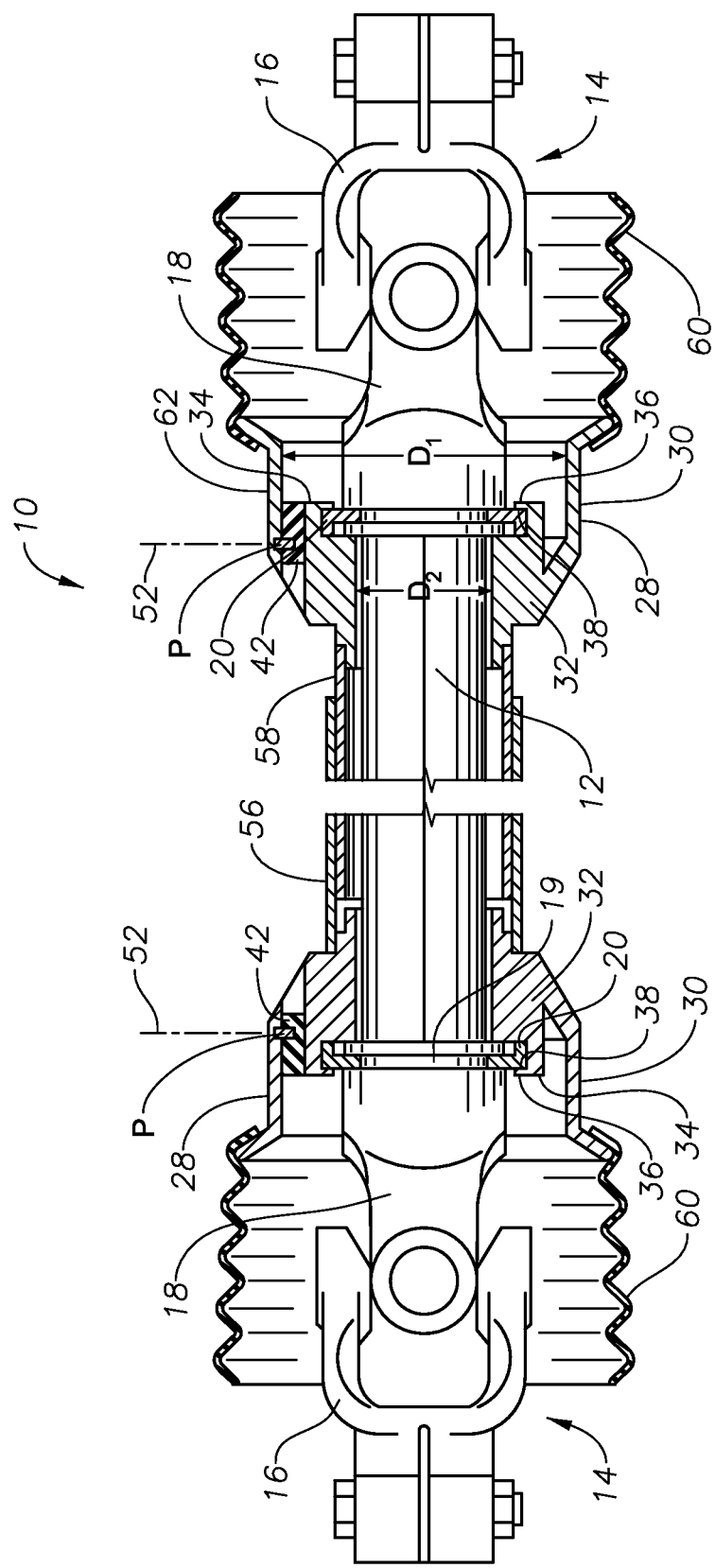
FIG. 1 is a longitudinal section view of the shield system of the invention.

FIG. 1 illustrates a driveshaft shield assembly 10 for driving agricultural equipment via the power take-off shaft of a tractor. Driveshaft assembly 10 generally is installed or mounted around a driveshaft 12 having a universal joint 14 on each end of the driveshaft 12. Each universal joint includes a first joint yoke 16 and a second joint yoke 18. Each first yoke 16 is disposed to connect to a power source (such as power take-off shaft) or equipment being driven. Each second yoke 18 is attached to the respective ends of the driveshaft 12. Each second yoke 18, or alternatively each end of driveshaft 12, is provided with a groove or channel 19 for receipt of a bearing 20 (see FIG. 2). The foregoing description of a driveshaft and universal joints is well known in the industry and recited only to provide context for certain embodiments of the driveshaft shield assembly 10.

Figure 2:
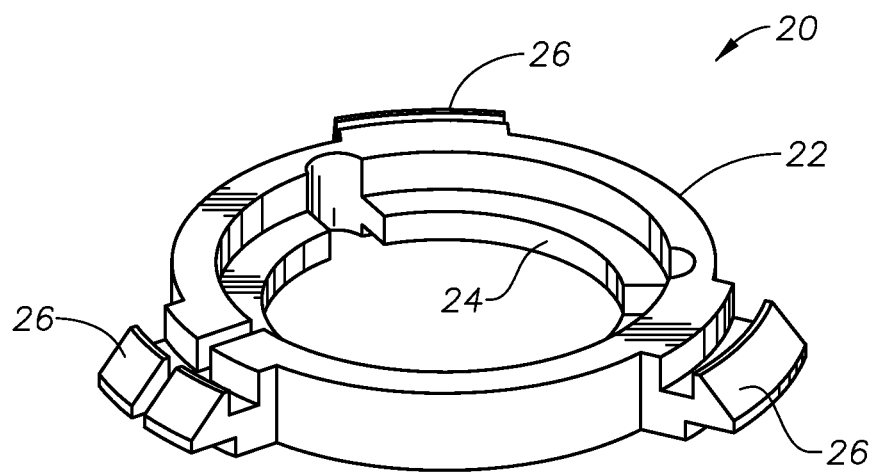
FIG. 2 is a three-dimensional view of an outer bearing utilized in the shield system.

With reference to FIG. 2 and ongoing reference to FIG. 1, bearing 20 is formed of a ring 22 with a flange 24 disposed around the inner circumference of ring 22. Likewise, ring 22 includes one or more tabs or projections or lugs 26 disposed on the outer circumference of ring 22. In certain preferred embodiments, at least three tabs 26 are provided, equally spaced around the outer circumference of ring 22. As shown in FIG. 1, ring 22 is disposed to fit around second yoke 18 (or driveshaft 12) so that flange 24 rides in groove 19. As such, bearing 20 is axially aligned with driveshaft 12. Those persons of ordinary skilled in the art will appreciate that the material for ring 22 is selected to minimize friction between second yoke 18 and ring 22 as second yoke 18 rotates relative to ring 22. In certain embodiments, ring 22 may be fabricated of plastic, such as for example, polyamide, although the invention is not limited to this material, and ring 22 may be fabricated of any suitable bearing material. Although bearing 20 is illustrated as a single integrally formed piece with a single split to allow it to be mounted in groove 19, persons of ordinary skill in the art will appreciate that bearing 20 could also be formed of two or more pieces fastened together.

Figure 3A:
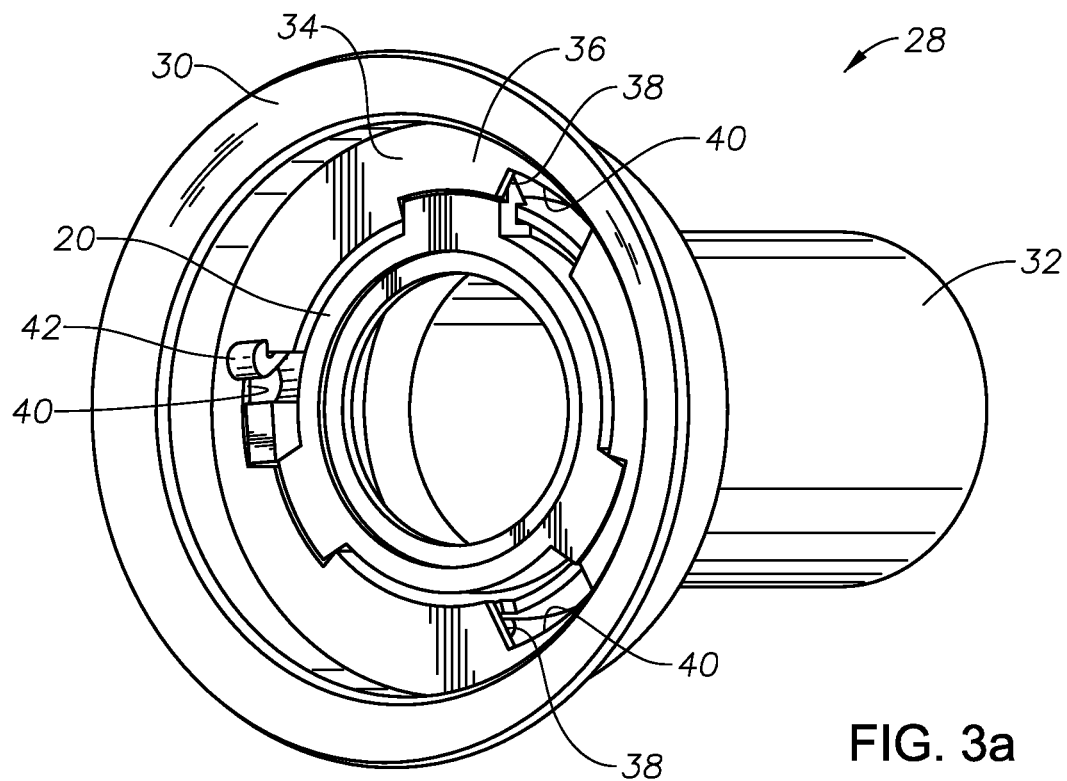
FIGS. 3a and 3b are a three-dimensional view of a connection cap of the invention.
Figure 3B:
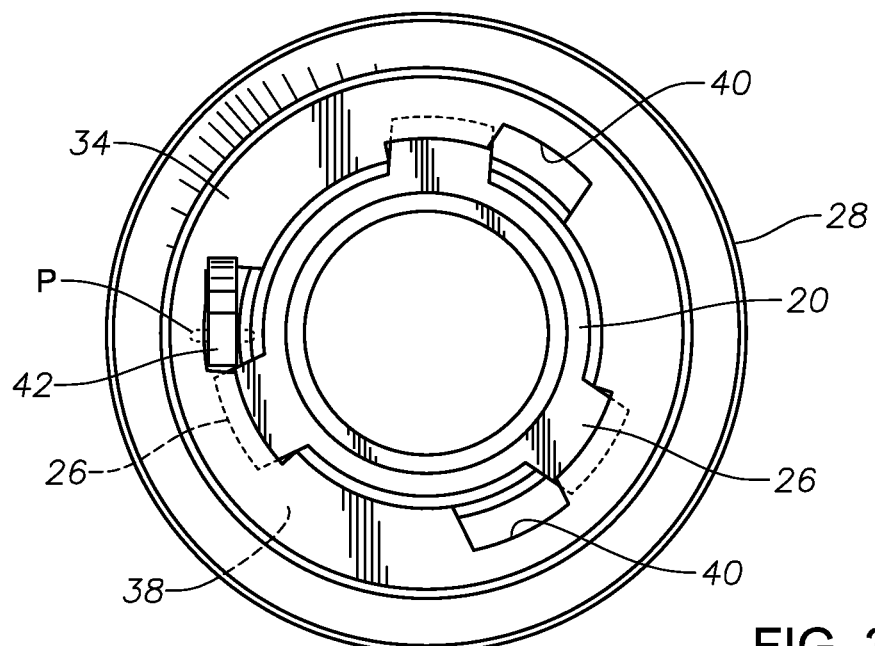

With reference to FIGS. 3a and 3b and ongoing reference to FIG. 1, a connecting cap 28 is disposed to engage bearing 20 and partially cover universal joint 14. Connecting cap 28 is characterized by a first portion 30 and a second portion 32 with a shoulder 34 formed therebetween. In certain embodiments, first portion 30 has a first diameter $D_1$ and a second portion 32 has a second diameter $D_2$ smaller than the first diameter, such that shoulder 34 is formed at the junction of the first portion 30 and second portion 32. In any event, shoulder 34 is characterized by an inner surface 36 and an outer surface 38. At least one radially extending slot 40 is defined in shoulder 34. Slot 40 is disposed for receipt of bearing tab 26, such that, when bearing tab 26 is seated in slot 40, rotation of bearing 20 relative to cap 28 causes tab 26 to abut outer surface 38 of shoulder 34, thereby engaging bearing 20 and cap 28.

Figure 4:
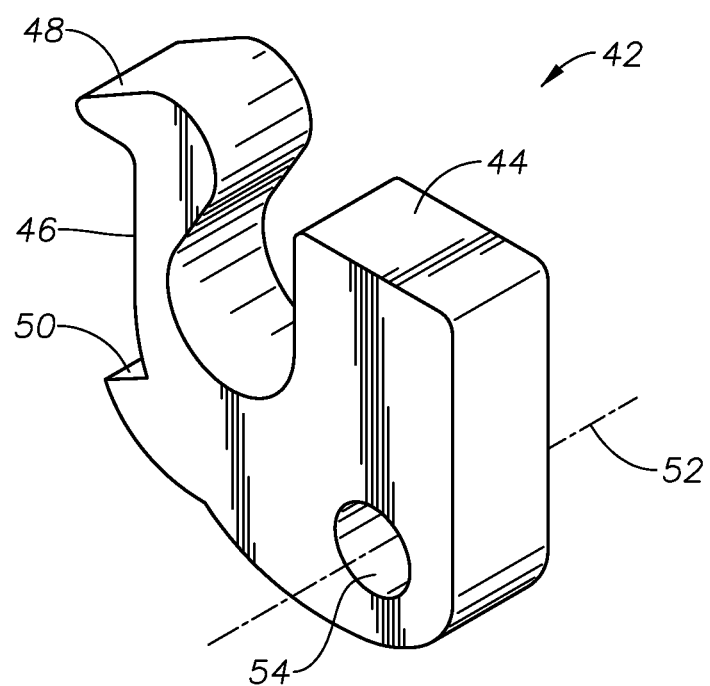
FIG. 4 is a three-dimensional view of the U-shaped clip of the shield system

With reference to FIG. 4 and on reference to FIG. 1, driveshaft assembly 10 includes a novel clip 42 to secure bearing tab 26 against shoulder 34 and prevent rotation of bearing 20 relative to cap 28. Clip 42 is U-shaped, having a first leg 44 and a second leg 46. In a preferred embodiment, the first leg 44 has a thickness greater than the second leg 46. The thickness of second leg 46 of the clip 42 is selected to permit second leg to partially deflect towards first leg 44 under application of a bending force. Second leg 46 includes a first foot 48 extending from the distal end of leg 46. In alternative embodiments, a second foot 50 may be formed at the proximal end of leg 46. Although not necessary, in certain preferred embodiments, second leg 46 may be contoured to enhance resiliency while strengthening leg 46 at its distal and proximal ends.

The clip 42 is disposed to pivot about an axis 52 so that clip 42 may pivot from a first locking position (FIG. 5A) to a second release position (FIG. 5B) as will be described. In certain preferred embodiments, an aperture 54 disposed for receipt of a pin P may be formed along the pivot axis 52. Alternatively, one or more projections (not shown) may be integrally formed on the clip so as to be coaxial with pivot axis 52.

While clip 42 may be formed of any type of material without limiting the invention, it has been found that under the conditions in which drive shaft assembly 10 is utilized, and in light of the frequency of manipulation of clip 42 that is likely to occur under normal conditions, in certain preferred embodiments, clip 42 may be formed of polyoxymethylene or another material having the characteristics of high stiffness and low friction.

Returning to FIG. 1, the second portion 32 of cap 28 serves to secure and center a first protective tube 56 relative to the driveshaft 12. A second nesting protective tube 58 may also be provided as is well known in the art. For example, second portion 32 of cap 28 may have a stepped circumferential end so that it may secure and center either first tube 56 or second tube 58. A protective bellows or cone 60 is secured to the first portion 30 of cap 28 and extends over the universal joint 14.

With reference to FIGS. 5A and 5B, clip 42 is pivotally attached to cap 28 so that clip 42 can pivot between a first locking position (FIG. 5A) in which clip 42 extends into slot 40 of cap 28 and a second release position (FIG. 5B) in which clip 42 is withdrawn from slot 40. In the first locking position, first leg 44 of clip 42 secures bearing tab 26 in the engagement configuration where tab 26 abuts outer surface 38 of shoulder 34. In this position, first leg 44 prevents relative rotation between cap 28 and bearing 20. Further, in this first locking position, foot 48 engages the edge of slot 40 so that foot 48 abuts the inner surface 36 of shoulder 34. Because of the flexibility of second leg 46, second leg 46 can be elastically deformed to allow foot 48 to pass over the edge of slot 40 and seat against shoulder 36.

In the second release position, clip 42 pivots on axis 52 until clip 42 is withdrawn from slot 40, thereby permitting bearing 20 to be rotated relative to cap 28 until tab 26 is aligned with slot 40, at which point the bearing 20 and cap 28 can be disengaged from one another. Foot 50 may be provided to facilitate manipulation of clip 42 between the first and second positions.

Clip 42 is mounted on cap 28 so that axis 52 of clip 42 is substantially perpendicular to the axis of drive shaft 12. Moreover, in certain preferred embodiments, the pivot axis 52 of clip 42 is spaced apart or offset from the drive shaft 12 axis so that clip 42 is not symmetrically positioned on cap 28 so as to minimize the effect of vibrations on clip 42 from operation of drive line 12. Regardless of the positioning of clip 42 on cap 28, clip 42 may be mounted on cap 28 in any number of ways without limiting the invention. In certain embodiments, such as is illustrated in FIG. 1, cap 28 may include a mounting bracket 62 and a pin P may be inserted in aperture 54 between the legs of bracket 62. In certain embodiments, the pin P may be hot melted into place. In certain embodiments, projections may be integrally formed on clip 42 along axis 52, and the projections can be seated in corresponding apertures (not shown) in the legs of bracket 62 in a manner that is well known in the art. Although not a limitation, bracket 62 may be integrally formed as part of cap 28. In yet another embodiment, only a single projection may extend from clip 42 along axis 52, which projection can be disposed to securely seat in a corresponding aperture formed in cap 28.

Those persons of ordinary skill in the art will appreciate that the above-described cap, bearing, clip configuration is preferably disposed on opposite ends of a drive shaft so as to support one or more guard tubes therebetween, such as is illustrated in FIG. 1. However, for simplicity of description, only the cap, bearing, and clip assembly at one end of drive shaft 12 has been specifically described. Likewise, while only one clip has been described, a U-shaped clip may be provided for more than one lug or may be provided for each lug of a bearing.

Moreover, while the driveline system 10 has been described in an assembled relationship, those or ordinary skill in the art will appreciate that the system is readily retrofitted on existing agricultural equipment and therefore, may be provided in a kit comprising a U-shaped clip as described herein, a connector cap as described herein, a bearing as described herein and a set of instructions describing how to install or retrofit the system 10 over a driveline. Preferably, the kit includes a plurality of bearings 20 each with a flange 24 and/or ring 22 of a varying shape or dimension. For example, flanges 24 may be of varying thickness. Persons of ordinary skill in the art will appreciate that a retrofit kit must be disposed to engage drive shafts or yokes from different manufactures, which may have different diameter drive shafts or grooves or channels 19 of varying depth or thickness. Thus, in certain embodiments, the kit will include at least two, and preferably a plurality of bearings with varying dimensions. To install, the old bearing is exposed and removed. The new bearing of the invention is slipped or clamped onto the shaft. In certain embodiments, the split ring nature of the bearing, as illustrated in FIG. 2, allows it to be slipped over the shaft so that the flange 24 seats in the respective channel 19. The connecting cap 28 is then engaged with the bearing as described above and rotated relative to the bearing until the bearing tab 26 is positioned adjacent the outer surface 38 of shoulder 34, after which, clip 42, carried by the cap 28, is pivoted to lock cap 28 to bearing 20. In certain embodiments, the kit may further include a tubular driveline guard or cover as well as a flexible bellows.

In any event, it has been found that unlike many of the prior art fasteners used to secure driveline shield assemblies for agricultural equipment, the u-shaped clip of the invention remains securely fastened even when subjected to a high degree of vibrations that characterize operating conditions for such agricultural equipment, as well as the environment in which the equipment is operated.

Thus, a driveline shielding system for agricultural equipment has been described. The system includes a connecting cap having a first portion and a second portion formed along a primary axis with a shoulder formed between the first and second portions, the shoulder having an inner surface and an outer surface with at least one radially extending slot defined in the shoulder. The system further includes a bearing comprised of a ring having at least one tab extending from the perimeter of the ring, said ring disposed to seat within said slot of said connecting cap, as well as a u-shaped clip attached to aid connecting cap and disposed to pivot between a first position in which said clip extends into a portion of the slot and a second position in which said clip is withdrawn from said slot.

In another embodiment, a driveline shielding system for agricultural equipment may include a connecting cap having a first portion with a first diameter and a second portion with a second diameter smaller than the first diameter, the cap formed along a primary axis with a shoulder formed between the first and second portions, the shoulder having an inner surface and an outer surface with at least three radially extending slot defined in the shoulder, said slots equally spaced from one another around the shoulder. Such embodiment may further include a bearing comprised of a ring having at least one three tabs extending from the perimeter of the ring and equally spaced from one another, said tabs disposed to seat within said slots of said connecting cap and abuts the outer surface of the shoulder. Such embodiment may further include a u-shaped clip attached to aid connecting cap and disposed to pivot between a first position in which said clip extends into a portion of the slot and a second position in which said clip is withdrawn from said slot, wherein the clip comprises a first rigid leg having a first thickness, a second flexible leg having a second thickness that is less than the first thickness, and a first foot extending from the end of the second leg, wherein, in the first position, the first leg bears against one of the tabs to secure engagement between said cap and bearing and the first foot engages an edge of the slot so as to abut the inner surface of the shoulder.

In another embodiment, a kit for securing a protective shield on the driveshaft of agricultural equipment is provided. The kit includes a connecting cap having a first portion and a second portion formed along a primary axis with a shoulder formed between the first and second portions, the shoulder having an inner surface and an outer surface with at least one radially extending slot defined in the shoulder; a bearing comprised of a ring having at least one tab extending from the perimeter of the ring, said ring disposed to seat within said slot of said connecting cap; a u-shaped clip disposed to pivotally attach to the connecting cap so as to be movable between a first position in which said clip extends into a portion of the slot and a second position in which said clip is withdrawn from said slot; and printed instructions describing installation of the protective shield around the driveshaft of the agricultural equipment.

Although various embodiments and methodologies have been shown and described, the invention is not limited to such embodiments and methodologies and will be understood to include all modifications and variations as would be apparent to one skilled in the art. Therefore, it should be understood that the invention is not intended to be limited to the particular forms disclosed. Rather, the intention is to cover all modifications, equivalents and alternatives falling within the spirit and scope of the invention as defined by the appended claims.

What is claimed:

1. A driveline shielding system for agricultural equipment, the system comprising:
   a. a connecting cap having a first portion and a second portion formed along a primary axis with a shoulder formed between the first and second portions, the shoulder having an inner surface and an outer surface with at least one radially extending slot defined in the shoulder;
   b. a bearing comprised of a ring having at least one tab extending from the perimeter of the ring, the ring disposed to seat within the slot of the connecting cap; and
   c. a u-shaped clip attached to aid connecting cap and disposed to pivot between a first position in which the clip extends into a portion of the slot and a second position in which the clip is withdrawn from the slot.

2. The system of claim 1, wherein the ring has at least three tabs, equally spaced apart around perimeter.

3. The system of claim 1, wherein the first portion of the cap has a first diameter and the second portion of the cap has a second diameter smaller than the first portion.

4. The system of claim 1, wherein the clip comprise a first leg and a second leg, wherein the first leg has a thickness greater than the second leg.

5. The system of claim 4, wherein the second leg is characterized by a proximal end and a distal end and the second leg comprises a first foot extending from the distal end of the leg.

6. The system of claim 5, wherein the second leg comprises a second foot formed at the proximal end of the leg.

7. The system of claim 6, wherein the second leg is contoured along at least a portion of its length.

8. The system of claim 4, wherein the first leg is rigid and the second leg is flexible.

9. The system of claim 1, wherein the clip is secured to connecting cap by a pin hot melted to the connecting cap.

10. The system of claim 1, wherein the clip is fabricated of polyoxymethylene.

11. The system of claim 1, wherein the system further comprises a first protective tube attached to the second portion of the connecting cap.

12. The system of claim 1, wherein the system further comprises a bellows secured to the first portion of the connecting cap.

13. The system of claim 1, wherein the clip, in the first position, secures engagement between the cap and bearing, wherein the bearing tab abuts the outer surface of the shoulder.

14. The system of claim 13, wherein a first leg of the clip bears against the bearing tab and the first foot engages an edge of the slot so as to abut the inner surface of the shoulder.

15. The system of claim 1, wherein the clip is mounted on the cap so that a pivot axis of the clip is substantially perpendicular to the primary axis of the cap.

16. The system of claim 15, wherein the pivot axis of the clip is offset from the primary axis of the cap.

17. The system of claim 1, wherein the cap further comprises a bracket, wherein the clip is mounted to the cap by the bracket.

18. The system of claim 1, wherein the system comprises a second connecting cap, a second bearing, a second clip, and a protective tube, wherein the two connecting caps are spaced apart from one another and the protective tube is disposed between the two connecting caps.

19. A driveline shielding system for agricultural equipment, the system comprising:
   a. a connecting cap having a first portion with a first diameter and a second portion with a second diameter smaller than the first diameter, the cap formed along a primary axis with a shoulder formed between the first and second portions, the shoulder having an inner surface and an outer surface with at least three radially extending slots defined in the shoulder, the slots equally spaced from one another around the shoulder;

b. a bearing comprised of a ring having at least three tabs extending from the perimeter of the ring and equally spaced from one another, the tabs disposed to seat within the slots of the connecting cap and abuts the outer surface of the shoulder; and c. a u-shaped clip attached to aid connecting cap and disposed to pivot between a first position in which the clip extends into a portion of the slot and a second position in which the clip is withdrawn from the slot, wherein the clip comprises a first rigid leg having a first thickness, a second flexible leg having a second thickness that is less than the first thickness, and a first foot extending from the end of the second leg, wherein, in the first position, the first leg bears against one of the tabs to secure engagement between the cap and bearing and the first foot engages an edge of the slot so as to abut the inner surface of the shoulder.

20. The system of claim 19, wherein the clip is fabricated of polyoxymethylene.

21. The system of claim 19, wherein the system further comprises a first protective tube attached to the second portion of the connecting cap and a bellows secured to the first portion of the connecting cap.

22. The system of claim 19, wherein the clip is mounted on the cap so that a pivot axis of the clip is substantially perpendicular to the primary axis of the cap and the pivot axis of the clip is offset from the primary axis of the cap.

23. The system of claim 19, wherein the bearing ring comprises a flange disposed around an inner circumference of the ring.

* * * * *